（12) United States Patent
Hasegawa

(10) Patent No.: US 11,536,898 B2
(45) Date of Patent: Dec. 27, 2022

(54) OPTICAL WAVEGUIDE DEVICE AND MANUFACTURING METHOD OF OPTICAL WAVEGUIDE DEVICE

(71) Applicant: FURUKAWA ELECTRIC CO., LTD., Tokyo (JP)

(72) Inventor: Junichi Hasegawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/537,855

(22) Filed: Aug. 12, 2019

(65) Prior Publication Data

US 2019/0377132 A1    Dec. 12, 2019

Related U.S. Application Data

(63) Continuation of application No. PCT/JP2018/003466, filed on Feb. 1, 2018.

(30) Foreign Application Priority Data

Feb. 15, 2017   (JP) .............................. JP2017-025528

(51) Int. Cl.
*G02B 6/122*     (2006.01)
*G02B 6/136*     (2006.01)
(Continued)

(52) U.S. Cl.
CPC ............. *G02B 6/1223* (2013.01); *G02B 6/12* (2013.01); *G02B 6/125* (2013.01); *G02B 6/126* (2013.01);
(Continued)

(58) Field of Classification Search
None
See application file for complete search history.

(56) References Cited

U.S. PATENT DOCUMENTS 8,477,409 B2    7/2013   Kawashima et al.
10,310,159 B2    6/2019   Nagashima et al.
(Continued)

FOREIGN PATENT DOCUMENTS

JP    07-253516 A    10/1995
JP    10-246825 A    9/1998
(Continued)

OTHER PUBLICATIONS

International Search Report dated Mar. 13, 2018 in PCT/JP2018003466 filed Feb. 1, 2018 (with English translation).
(Continued)

*Primary Examiner* — Jiong-Ping Lu
(74) *Attorney, Agent, or Firm* — Oblon, McClelland, Maier & Neustadt, L.L.P.

(57) ABSTRACT

A manufacturing method of an optical waveguide device that allows light to propagate through a core formed within a cladding formed on a substrate, the core having a higher refractive index than the cladding, includes: layering a first cladding-material layer for the cladding and a core-material layer for the core sequentially on the substrate; forming the layered core-material layer into the core having a waveguide shape, and removing a first part of the core, the first part being positioned at a portion where a slit is to be formed, to thereby form a gap in the core; layering a second cladding-material layer for the cladding to cover the first cladding-material layer and the core; and removing, by dry-etching, a second part of the first and second cladding-material layers, the second part being positioned at the portion where the slit is to be formed, to thereby form the slit.

5 Claims, 10 Drawing Sheets

(51) Int. Cl.
  *G02B 6/12* (2006.01)
  *G02B 6/13* (2006.01)
  *G02B 6/27* (2006.01)
  *G02B 6/125* (2006.01)
  *G02B 6/126* (2006.01)

(52) U.S. Cl.
  CPC ........... *G02B 6/12007* (2013.01); *G02B 6/13* (2013.01); *G02B 6/136* (2013.01); *G02B 6/2773* (2013.01); *G02B 2006/12038* (2013.01); *G02B 2006/12164* (2013.01)

(56) References Cited

U.S. PATENT DOCUMENTS

| | | | |
|---|---|---|---|
| 2004/0067023 A1* | 4/2004 | Hanashima | G02B 6/12007 385/43 |
| 2012/0163752 A1 | 6/2012 | Kim et al. | |
| 2013/0209111 A1 | 8/2013 | Kawashima et al. | |

FOREIGN PATENT DOCUMENTS

| | | | | |
|---|---|---|---|---|
| JP | H10246825 | * | 9/1998 | ............... G02B 6/12 |
| JP | 2013-061431 A | | 4/2013 | |
| JP | 2015-219317 A | | 12/2015 | |
| JP | 2015219317 | * | 12/2015 | ............ G02B 6/122 |
| JP | 2014-146004 A | | 1/2017 | |
| JP | 2017-009917 A | | 1/2017 | |
| JP | 2017-009918 A | | 1/2017 | |
| WO | WO 2011/152202 A1 | | 12/2011 | |

OTHER PUBLICATIONS

Written Opinion dated Mar. 13, 2018 in PCT/JP2018003466 filed Feb. 1, 2018.
Office Action dated Oct. 16, 2018 in Japanese Patent Application No. 2017-025528 (with English Translation).
Office Action dated Dec. 18, 2018 in Japanese Patent Application No. 2017-025528 (with English Translation).

\* cited by examiner

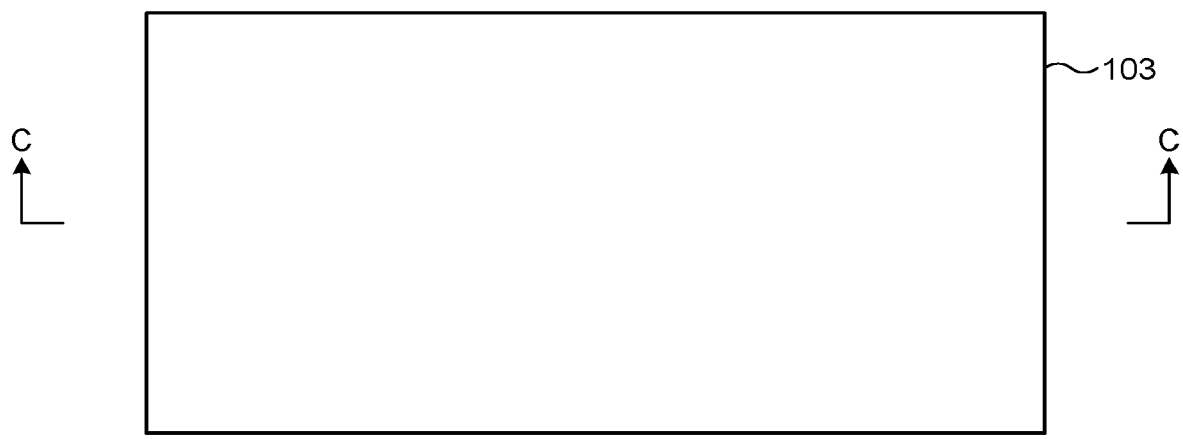
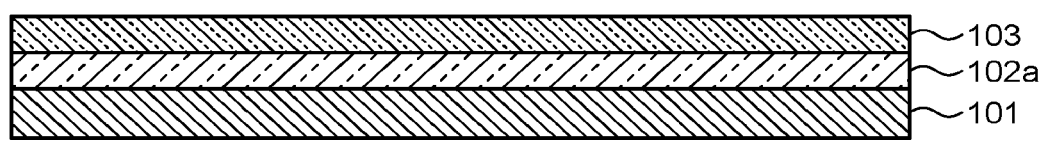

OPTICAL WAVEGUIDE DEVICE AND MANUFACTURING METHOD OF OPTICAL WAVEGUIDE DEVICE

CROSS-REFERENCE TO RELATED APPLICATION(S)

This application is a continuation of International Application No. PCT/JP2018/003466, filed on Feb. 1, 2018 which claims the benefit of priority of the prior Japanese Patent Application No. 2017-025528, filed on Feb. 15, 2017, the entire contents of which are incorporated herein by reference.

BACKGROUND

The present disclosure relates to an optical waveguide device and a manufacturing method of an optical waveguide device.

Some optical devices for use in optical communication may use an optical waveguide device including a planar light-wave circuit (PLC) made from quartz glass. For optical waveguides constituting a PLC, a technique of using zirconia as a dopant to increase a refractive index has been known. Zirconia is a material that has a high refractive index and a low thermal expansion coefficient compared to germania or germanium oxide. By using zirconia as a dopant, it is possible to significantly increase a relative refractive-index difference between a core and a cladding portion, compared to by using germania as a dopant. Thus, the allowable minimum bend radius for an optical waveguide decreases, and downsizing and high-density integration of PLC can be expected.

Moreover, there is an optical waveguide device in which a slit transverse to an optical waveguide is formed, and an optical filter is inserted in this slit. For example, when TE-polarized light (linearly polarized light having polarization direction parallel to a main surface of a substrate on which the cladding portion is formed) propagating through the optical waveguide is converted into TM-polarized light (linearly polarized light having a polarization direction perpendicular to TE-polarized light), a ½ wave plate is inserted into the slit. Specifically, the ½ wave plate is arranged in the slit such that its optical axis (fast axis or slow axis) forms an angle of 45° relative to the main surface of the substrate. In the optical waveguide device having such a configuration, when TE-polarized light is propagated from one portion of the optical waveguide into the ½ wave plate, the polarization direction thereof is rotated by 90° at the ½ wave plate. As a result, the TE-polarized light is converted into TM-polarization light and then output to the other portion of the optical waveguide from the ½ wave plate. Similarly, when TM-polarized light is propagated from one portion of the waveguide, the light is converted into TE-polarized light by the ½ wave plate and then output to the other portion of the optical waveguide. Furthermore, when TM-polarized light is propagated from the other portion of the optical waveguide, the light is converted into TE-polarized light by the ½ wave plate and then output to one portion of the optical waveguide.

SUMMARY

When circuits are formed in high density using optical waveguides with a high relative refractive-index difference, there are two main technical challenges in terms of forming a slit.

One is an increase of optical loss at the slit if the relative refractive-index difference becomes high. FIG. 12 is a graph showing an example of an optical loss at a slit in relation to a relative refractive-index difference in an optical waveguide. As shown in FIG. 12, as the relative refractive-index difference increases, the optical loss at the slit exponentially increases.

The other one is difficulty in forming a slit because optical waveguides are densely arranged on a device. When a slit is formed by making a cut in an optical waveguide device by using a dicing saw, an unnecessary cut may be made in a portion around the optical waveguide because the dicing saw has a disc shape. That is, when a slit is formed by using a dicing saw, other optical waveguides cannot be formed therearound. Generally, when using a dicing saw, a slit can be formed only at an end portion of an optical waveguide. Accordingly, a method of using dry etching in forming a slit can also be considered (for example, Japanese Laid-open Patent Publication No. 2014-146004 (JP-A-2014-146004)). However, this method is also inappropriate for the following reason.

When a slit transverse to an optical waveguide is formed by etching, a core and a cladding of the optical waveguide are to be etched at the same time, but a core and a cladding of an optical waveguide generally have different etching rates. As a result, the depth of a slit formed by etching varies between a region only with the cladding and a region including the core. Moreover, because properties of materials of a core and a cladding tend to be significantly different in an optical waveguide having a high relative refractive-index difference, the variation in depth of a slit can become greater in an optical waveguide having a high relative refractive-index difference.

According to a first aspect of the present disclosure, there is provided a manufacturing method of an optical waveguide device that allows light to propagate through a core formed within a cladding formed on a substrate, the core having a higher refractive index than the cladding. The method includes layering a first cladding-material layer for the cladding and a core-material layer for the core sequentially on the substrate; forming the layered core-material layer into the core having a predetermined waveguide shape, and removing a first part of the core, the first part being positioned at a portion in which a slit is to be formed, to thereby form a gap in the core; layering a second cladding-material layer for the cladding to cover the first cladding-material layer and the core; and removing, by using dry-etching, a second part of the first and second cladding-material layers, the second part being positioned at the portion in which the slit is to be formed, to thereby form the slit.

According to a second aspect of the present disclosure, an optical waveguide device is provided which includes a cladding formed on a substrate; a core formed within the cladding, the core having a higher refractive index than the cladding; and a slit that extends transversely relative to the core, wherein a width of a gap at a position in the core, the position corresponding to the slit is smaller than a width of the slit.

According to a third aspect of the present disclosure, an optical waveguide device is provided which a cladding formed on a substrate; a core formed within the cladding, the core having a higher refractive index than the cladding; and a slit that extends transversely relative to the core, wherein a core-material layer for the core is formed of quartz glass doped with a dopant that has a higher refractive index, a lower linear thermal-expansion coefficient, and a higher melting point than germania (GeO$_2$), and the slit is formed in a region apart from an end portion of the optical waveguide device.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 7A is a top view illustrating a state after layering is completed up to a core material layer;

FIG. 7B is a cross section illustrating the state after layering is completed up to the core material layer;

DETAILED DESCRIPTION

Hereinafter, embodiments of an optical waveguide device and a manufacturing method thereof are described in detail with reference to the drawings. The embodiments described in the following are not intended to limit the present disclosure. Moreover, like reference symbols are appropriately assigned to like or corresponding components throughout the respective drawings. Furthermore, the drawings are illustrated schematically, and it is noted that a relationship in dimensions of respective components, a ratio of dimensions of the respective components, and the like may differ from those in an actual situation. There can be part in which relationships in dimensions or ratios differ from one another among the drawings also.

Embodiment of Optical Waveguide Device

Figure 1:
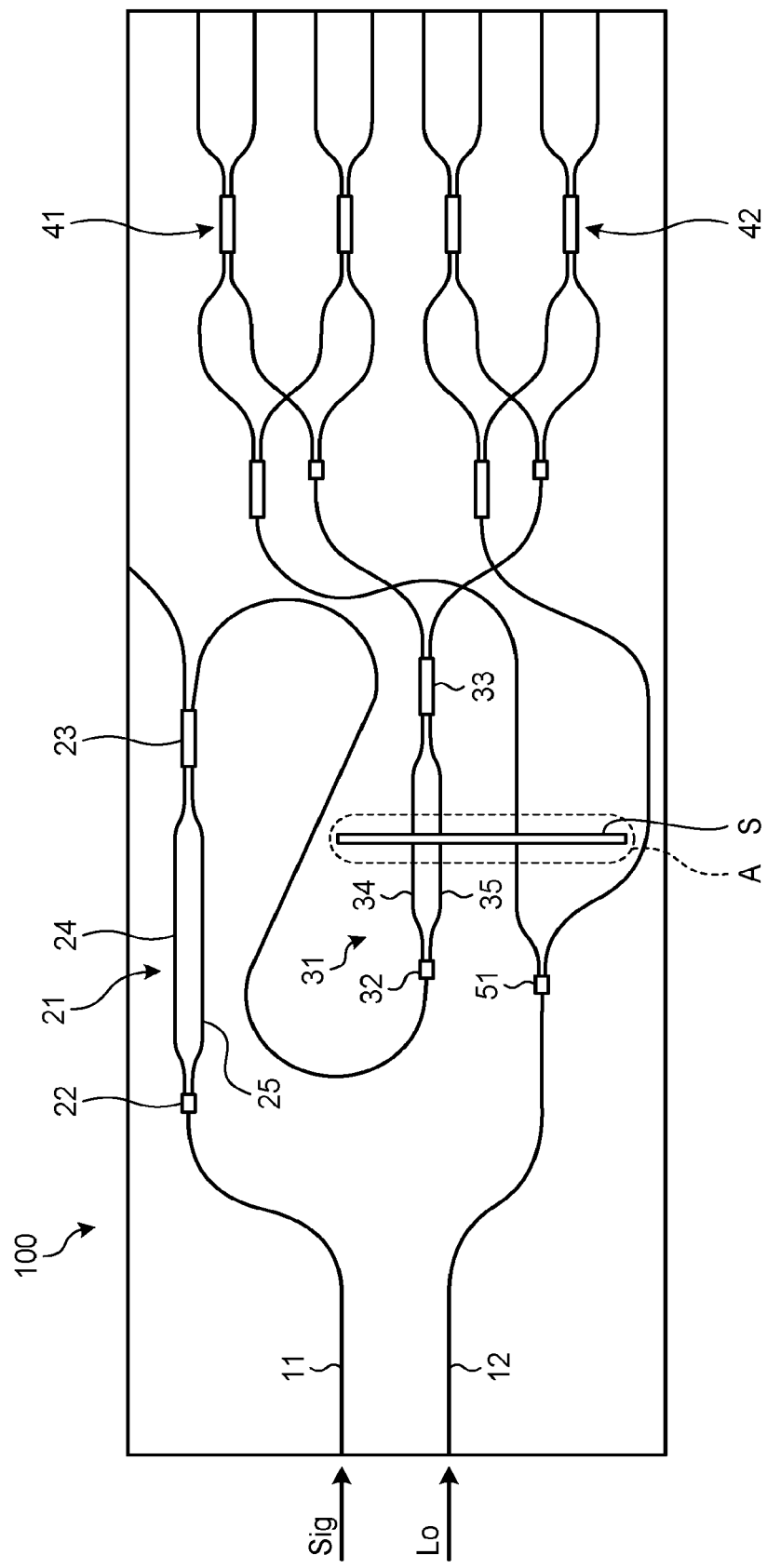
FIG. 1 is a schematic plan view of an optical waveguide device according to an embodiment.

FIG. 1 is a schematic plan view of an optical waveguide device according to an embodiment. The optical waveguide device illustrated in FIG. 1 is a PLC-type optical waveguide device made of a quartz glass material, and assumed to be used as a coherent mixer. Specifically, the optical waveguide device illustrated in FIG. 1 is suitable for adopting a slit structure described later.

That is, an optical waveguide device 100 illustrated in FIG. 1 has a slit S formed in a region A apart from an end portion. In addition, other optical waveguides are formed around the region A. That is, if the slit S is attempted to be formed in the region A by using a dicing saw, the optical waveguides therearound may be damaged.

As illustrated in FIG. 1, the optical waveguide device 100 includes an input optical waveguides 11, 12, a variable light attenuator 21, a polarization demultiplexer 31, a 90-degree hybrid devices 41, 42, and a Y-split optical waveguide 51. Moreover, the optical waveguide device 100 includes the slit S arranged in the region A. In the slit, a wave plate is inserted as described later.

The input optical waveguide 11 is connected to the variable light attenuator 21 through a bent portion in an S shape. The S-shaped bent portion is formed of two curved portions that are connected in series with each other. The curved portions have the same curvature radius and the same arc angle, but have opposite curvatures. A signal light Sig is input to the input optical waveguide 11. On the other hand, the input optical waveguide 12 is connected to the Y-split optical waveguide 51 through another bent portion in an S shape. This S-shaped bent portion is formed of two curved portions that are connected in series with each other. The curved portions have the same curvature radius and the same arc angle, but have opposite curvatures. A local oscillation light Lo of linear polarization is input to the input optical waveguide 12.

The variable light attenuator 21 has a configuration of a Mach-Zehnder interferometer including a Y-split waveguide 22, a directional coupler 23, and two arm waveguides 24, 25 that connect between the Y-split waveguide 22 and the directional coupler 23. Thin film heaters are arranged on top of the corresponding arm waveguides 24, 25 so that the arm waveguides 24, 25 can be heated by the respective thin film heaters. Effective refractive indexes of the arm waveguides 24, 25 are variable through a thermal optical effect of heat generated by the thin film heaters, and the variable light attenuator 21 can control an optical path length difference between the arm waveguides 24, 25. The variable light attenuator 21 can control an attenuation factor of light by controlling this effective optical path length difference variably. The signal light Sig output from the variable light attenuator 21 is guided to the polarization demultiplexer 31 through a connecting wave guide.

The polarization demultiplexer 31 has a configuration of a Mach-Zehnder interferometer including a Y-split waveguide 32, a directional coupler 33, and two arm waveguides 34, 35 that connect between the Y-split waveguide 32 and the directional coupler 33. In a middle of the respective two arm waveguides 34, 35, the slit S is arranged transversely to the arm waveguides 34, 35, and a ¼ wave plate is inserted in each slit. The signal light Sig divided into the arm waveguides 34, 35 are subjected to rotation of the plane of polarization by the respective ¼ wave plates, and to interference by the directional coupler 33, and are thereby divided into two polarization components. The divided polarization components of the signal light Sig are guided to the 90-degree hybrid device 41 and the 90-degree hybrid device 42, respectively.

On the other hand, the local oscillation light Lo branched by the Y-split optical waveguide 51 is separated to the connecting waveguides that are respectively connected to the 90-degree hybrid device 41 and the 90-degree hybrid device 42. In a middle of the connecting waveguide connected to the 90-degree hybrid device 41, the slit S is arranged transversely, and a wave plate is inserted in the slit. That is, out of the local oscillation light Lo, only one guided into the 90-degree hybrid device 41 is subjected to rotation of the plane of polarization. The slit S is shared by the polarization demultiplexer 31 and the connecting waveguide connected to the 90-degree hybrid device 41 in terms of effectiveness in arrangement and manufacturing. However, two slits each of which is the same as slit S may be provided respectively for the polarization demultiplexer 31 and the connecting waveguide.

The 90-degree hybrid devices 41, 42 are a kind of interference circuit. Each of the 90-degree hybrid devices 41, 42 inputs the signal light Sig and bifurcates the input signal light Sig; and inputs the local oscillation light Lo, bifurcates the input local oscillation light Lo, and causes a phase difference of 90 degrees to the bifurcated local oscillation light Lo as a relative phase difference of light wave; and then mixes one of the bifurcated signal light Sig and the local oscillation light Lo, and the other one of the bifurcated signal light Sig and the local oscillation light Lo.

The optical waveguide device 100 described above is an example of the embodiment of the present disclosure, and the configuration other than the slit S can be appropriately modified according to a usage purpose. For example, the Y-split waveguide may be replaced with 1×2 MMI coupler; and the directional coupler may be replaced with 2×2 MMI coupler, or the like. In the following, explanation is made on only part around the slit S.

Figure 2:
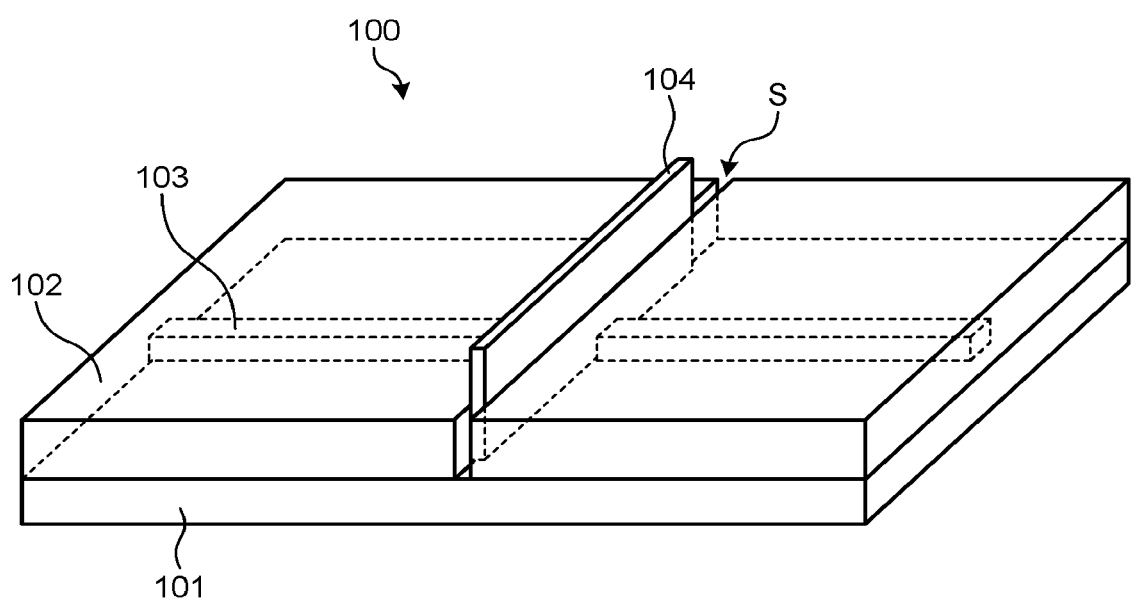
FIG. 2 illustrates a state in which a wave plate is inserted in a slit of the optical waveguide device.

FIG. 2 illustrates a state in which a wave plate is inserted in a slit of the optical waveguide device. Moreover, FIG. 3 illustrates an example of a cross-sectional structure of the optical waveguide device in a transverse direction with respect to an optical waveguide, and FIG. 4 illustrates an example of a cross-sectional structure of the optical waveguide device in an optical waveguide direction.

As illustrated in FIG. 2, the optical waveguide device 100 includes a substrate 101 made of silicon (Si) or quartz ($SiO_2$), a cladding 102 made of a quartz glass material formed on the substrate 101, and a core 103 formed within the cladding 102 and having a higher refractive index than the cladding 102. The core 103 is a component that corresponds to an optical waveguide practically in the optical waveguide device 100, and a solid line in FIG. 1 indicates a position of this core 103. That is, the optical waveguide herein is a structure guiding light by the core 103 that is formed in the cladding 102, and that has a higher refractive index than the cladding 102.

As illustrated in FIG. 2, the slit S is formed in a traverse manner relative to the core 103. In other words, the slid S extends transversely relative to a waveguide. Therefore, light propagating through the waveguide (the core 103) passes through a wave plate 104 inserted in the slit S. For the wave plate 104, for example, a ½ wave plate, a ¼ wave plate, or the like can be appropriately selected to be used. Moreover, for the wave plate 104, for example, a wave plate made of polyimide, or a wave plate made of a photonic crystal may be used.

Figure 3:
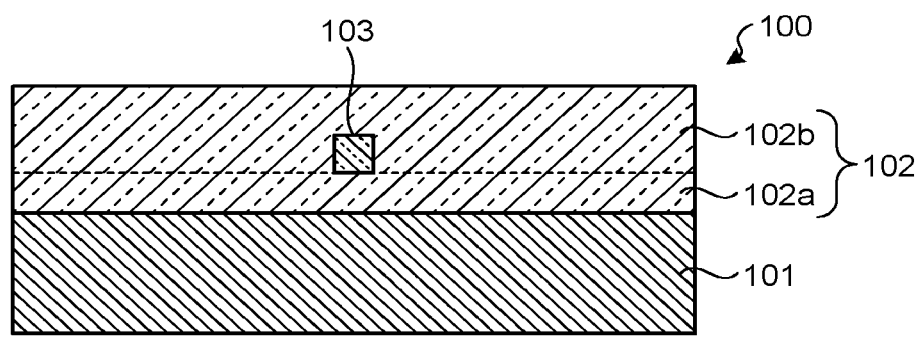
FIG. 3 illustrates an example of a cross-sectional structure of the optical waveguide device in a transverse direction with respect to an optical waveguide.
Figure 4:
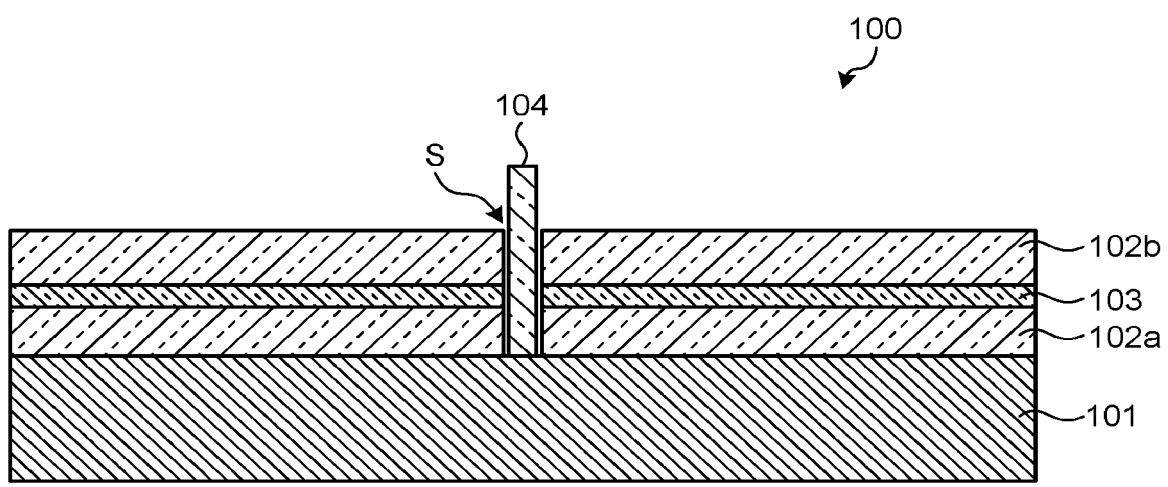
FIG. 4 illustrates an example of a cross-sectional structure of the optical waveguide device in an optical waveguide direction.

As illustrated in FIG. 3, the cladding 102 formed on the substrate 101 has a lower cladding 102a and an upper cladding 102b. The lower cladding 102a is on the substrate 101, and the upper cladding 102b is on the lower cladding 102a and the core 103. The lower cladding 102a and the upper cladding 102b are individually termed only because they are formed at different stages in manufacturing processes.

As illustrated in FIG. 4, the slit S is formed to have a depth reaching the substrate 101. That is, the depth of the slit S is a depth piercing through the upper cladding 102b, the core 103, and the lower cladding 102a. When the slit S is formed by dry etching, the upper cladding 102b, the core 103, and the lower cladding 102a can be etched in the same step, and the manufacturability is high.

Note that the slit S can be formed to have a depth including part of the substrate 101 also. For example, when the substrate 101 is made of silicon, the upper cladding 102b, the core 103, and the lower cladding 102a may be etched by using an etching gas of, for example, carbon tetrafluoride ($CF_6$) or the like, and the silicon substrate 101 may be etched by using an etching gas of sulfur hexafluoride ($SF_6$) or the like. On the other hand, when the substrate 101 is made of quartz, the slit S can be formed to the depth including part of the substrate 101 in the same one step without changing the etching gas. If the depth of the slit S is as deep as to include part of the substrate 101, the wave plate 104 inserted in the slit S becomes more stable.

Preferable materials to be doped in the core 103 are explained herein. To obtain the core 103 having a higher refractive index than the cladding 102, for example, zirconia ($ZrO_2$), germania ($GeO_2$), or the like may be doped in a quartz glass material. Particularly, to obtain an optical waveguide with a high relative refractive-index difference, it is preferable to use zirconia. It is because with the core 103 in which zirconia is doped, an optical waveguide having the relative refractive-index difference of 5.5% in a wavelength of 1.55 μm can be obtained, and the density of optical waveguides in the optical waveguide device 100 can be increased. A relative refractive-index difference Δ of a core with respect to a cladding of an optical waveguide is defined by an equation below.

$$\Delta = \{(nc1-nc)/nc1\} \times 100(\%)$$

where nc1 is the maximum refractive index of the core, and nc is a refractive index of the cladding.

Candidates of dopant other than zirconia are summarized in Table 1.

TABLE 1

| | Refractive Index | Linear Thermal-Expansion Coefficient ($\times 10^{-6}$) | Melting Point (° C.) |
| --- | --- | --- | --- |
| $Nb_2O_5$ | 2.82 | 2.0 | 1520 |
| $Ta_2O_5$ | 2.74 | 5.0 | 1468 |
| $TiO_2$ | 2.10 | 9.0 | 1850 |
| $ZrO_2$ | 2.20 | 8.0 | 2715 |
| $HfO_2$ | 1.96 | 6.5 | 2774 |
| $GeO_2$ | 1.70 | 12.0 | 1115 |

As shown in Table 1, niobium oxide ($Nb_2O_5$), tantalum oxide ($Ta_2O_5$), titanium oxide ($TiO_2$), zirconia ($ZrO_2$) hafnium oxide ($HfO_2$) have a higher refractive index than germania ($GeO_2$), but linear thermal-expansion coefficients are lower and melting points are higher. This shows that use of niobium oxide, tantalum oxide, titanium oxide, zirconia, or hafnium oxide is preferable in terms of contribution to downsizing of an optical waveguide device, but causes new challenges described in detail below.

Figure 5:
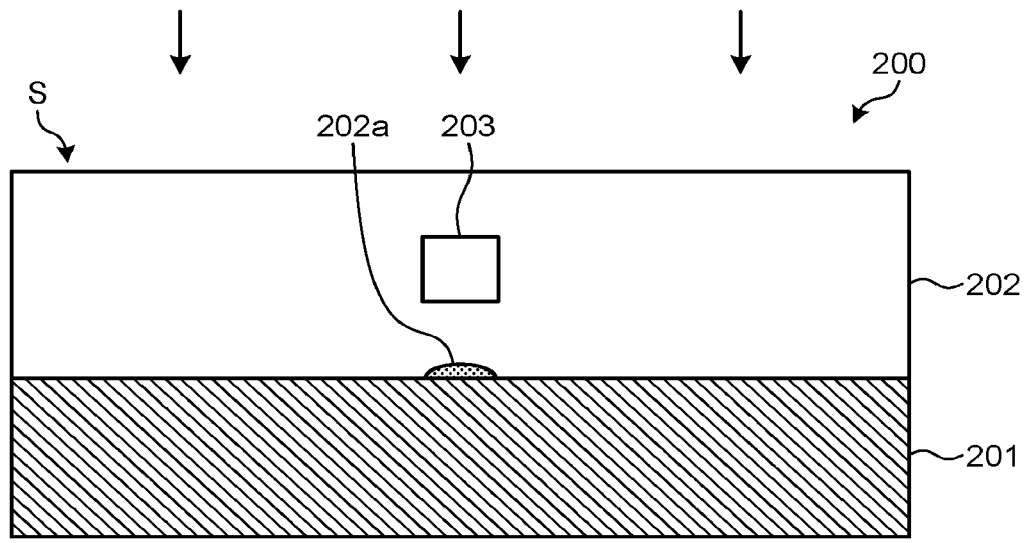
FIG. 5 is a cross section of a slit portion that is formed by a conventional method of forming a slit.

A problem caused when a material having a higher refractive index, a lower linear thermal-expansion coefficient, and a higher melting point than germania, such as niobium oxide, tantalum oxide, titanium oxide, zirconia, and hafnium oxide, is used as a dopant of a core is herein explained with reference to FIG. 5 and FIG. 6. FIG. 5 is a cross section of a slit portion that is formed by a comparative example of a method of forming a slit, and FIG. 6 is a cross section illustrating a state in which a wave plate is inserted in the slit formed by the comparative example of the method of forming a slit.

As illustrated in FIG. 5, in the slit S of an optical waveguide device 200 formed by such a method using dry etching, because the dry etching proceeds in a direction indicated by arrows in the drawing, a material of a cladding 202 remains as a residue 202a at a bottom surface below a portion of a core 203. This is caused because the etching speed of the core 203 is lower than that of the cladding 202 when a material having a higher refractive index, a lower linear thermal-expansion coefficient, and a higher melting point than germania, such as niobium oxide, tantalum oxide, titanium oxide, zirconia, and hafnium oxide, is used as a dopant of the core 203. Therefore, etching does not proceed to a desirable depth at the portion below the core 203 even if the etching proceeds to the desirable depth in a region only with the cladding 202. In this example, the residue 202a is the material of the cladding 202 because the slit S is intended to have the depth up to a boundary between the cladding 202 and a substrate 201, but when the slit S is made in the depth to include part of the substrate 201, the residue is to be the material of the substrate 201.

Figure 6:
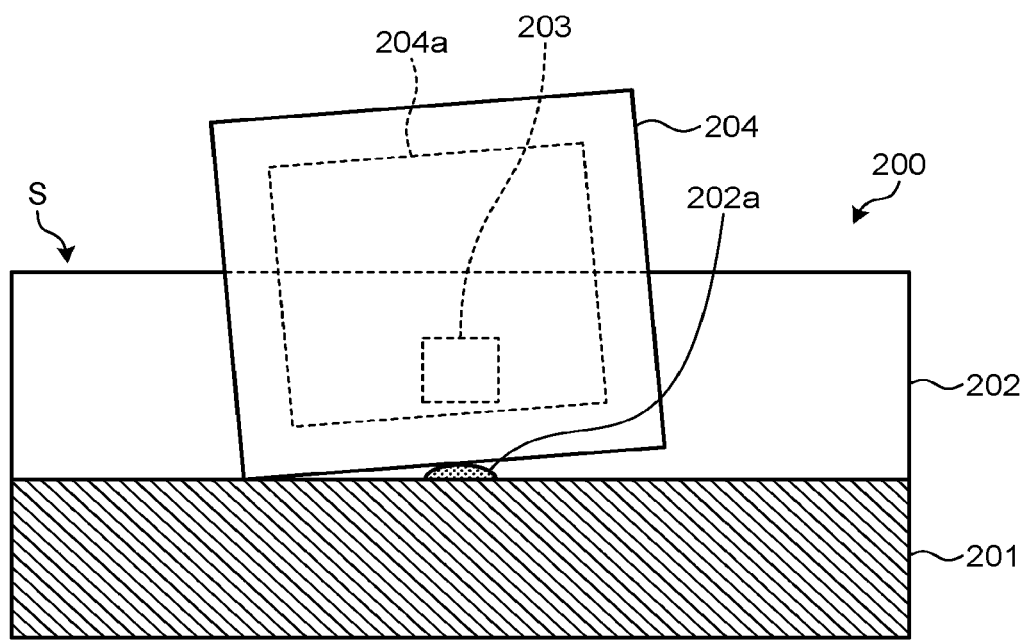
FIG. 6 is a cross section illustrating a state in which a wave plate is inserted in the slit formed by the conventional method of forming a slit.

As described, when a wave plate 204 is inserted in the slit S in which the material of the cladding 202 remains as the residue 202a, the wave plate 204 is to be inclined as illustrated in FIG. 6. If the wave plate is mounted in an inclined manner, a polarization extinction ratio is degraded, and a desirable property cannot be obtained. Moreover, the wave plate 204 is not necessarily effective to its edges due to manufacturing properties, for example, due to chipping or property variations in a plane, and an effective area 204a is limited. Moreover, an optical energy confined in the core 203 is not entirely confined in the core 203. Therefore, if the wave plate 204 is inclined, light can pass through at a portion outside the effective area 204a, resulting in affecting the optical properties. Accordingly, in the optical waveguide device of the present embodiment, the slit is formed by the following method.

Manufacturing Method

FIG. 7A, FIG. 7B, FIG. 8A, FIG. 8B, FIG. 9A, FIG. 9B, FIG. 10A, FIG. 10B, FIG. 11A, and FIG. 11B are diagrams illustrating a procedure of the manufacturing method of the optical waveguide device according to the embodiment. FIG. 7A, FIG. 8A, FIG. 9A, FIG. 10A, and FIG. 11A are top views of the optical waveguide device in a corresponding step. FIG. 7B, FIG. 8B, FIG. 9B, FIG. 10B, and FIG. 11B are cross sections of portions indicated by an arrow C in FIG. 7A, FIG. 8A, FIG. 9A, FIG. 10A, and FIG. 11A, respectively.

In the manufacturing method of the optical waveguide device according to the embodiment, first, a layer of a material of the lower cladding 102a and a layer of a material of the core 103 are sequentially layered. FIG. 7A and FIG. 7B are a top view and a cross section illustrating a state after the layering of the layer of the material of the core 103 is completed, respectively. As illustrated in FIG. 7A and FIG. 7B, in the state of this step, the layer of the material of the core 103 is layered on an entire surface when viewed from top, and the layers of the materials of the substrate 101, the lower cladding 102a, and the core 103 are horizontally layered when viewed on the cross section. The material of the substrate 101 is, for example, silicon or quartz, and the material of the lower cladding 102a is quartz glass. The layer of the material of the lower cladding 102a layered on a main planar surface of the substrate 101, for example, in thickness of 15 µm. The layer of the material of the core 103 is, for example, quartz glass including minute particles of zirconia, and is layered on the layer of the material of the lower cladding 102a, for example, in thickness of 3 µm. Thereafter, annealing is performed, to make the layers of the materials of the lower cladding 102a and the core 103 into transparent glass.

As described above, a dopant to be doped in the core 103 is not limited to zirconia, but a material having a higher refractive index, a lower linear thermal-expansion coefficient, and a higher melting point than germania, such as niobium oxide, tantalum oxide, titanium oxide, and hafnium oxide, can be used. Moreover, an amount of a dopant to be doped is assumed to be adjusted appropriately to obtain a relative refractive-index difference of 5.5% in this example, but the relative refractive-index difference can be, for example, 1.5% to 30% if a doping amount is adjusted.

Figure 8A:
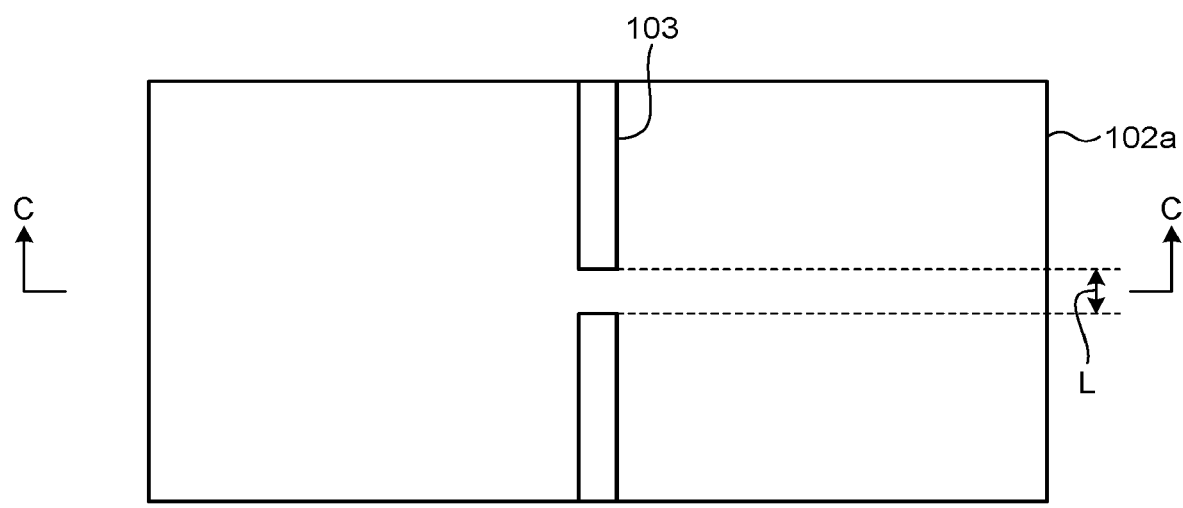
FIG. 8A is a top view illustrating a state after a core is formed.
Figure 8B:
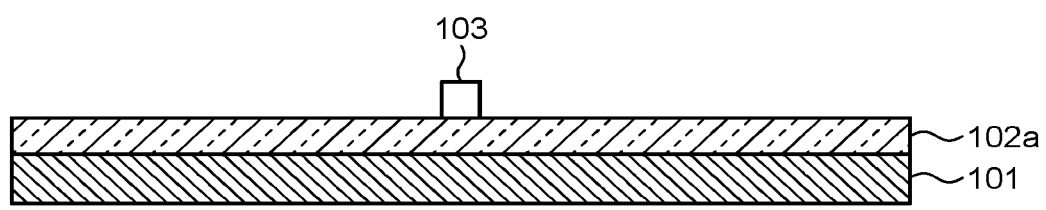
FIG. 8B is a cross section illustrating the state after the core is formed.

Next, the layer of the material of the core 103 is formed into a desirable shape of an optical waveguide by using a photolithography technique and dry etching. FIG. 8A and FIG. 8B are a top view and a cross section illustrating a state after the core 103 is formed, respectively. A width of the core 103 corresponding to the optical waveguide may be, for example, 3 µm. Moreover, the layer of the material of the core 103 at a portion in which a slit is to be formed is removed. A gap in the core 103 corresponding to the slit is in a width L for the sake of explanation later. As illustrated in FIG. 8A and FIG. 8B, in the state in this step, the core 103 in the shape of the optical waveguide is formed on the layer of the material of the lower cladding 102a, and a gap of the width L has already been formed in the portion corresponding to the slit in the core 103.

Figure 9A:
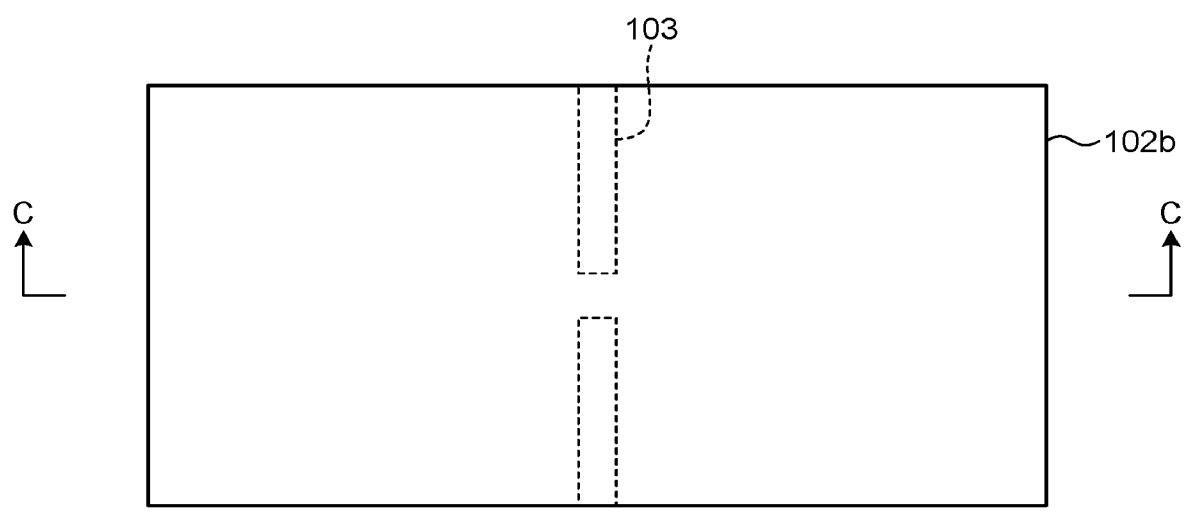
FIG. 9A is a top view illustrating a state after layering of an upper cladding.
Figure 9B:
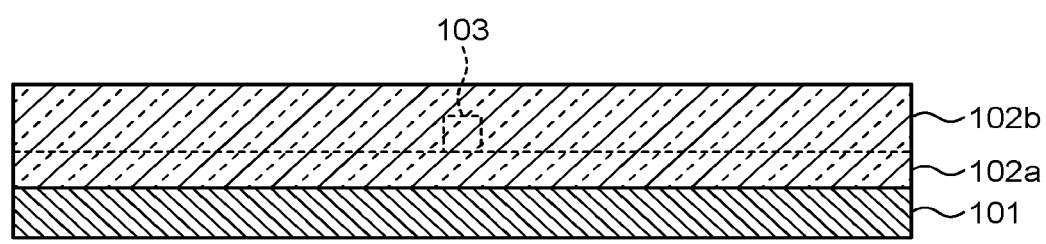
FIG. 9B is a cross section illustrating the state after layering of the upper cladding.

Next, a layer of the material of the upper cladding 102b is layered to cover the layer of the material of the lower cladding 102a and the core 103 in the shape of the optical waveguide. FIG. 9A and FIG. 9B are a top view and a cross section illustrating a state after the upper cladding 102b is layered, respectively. The material of the upper cladding 102b is the same as that of the lower cladding 102a, and namely is quartz glass. The thickness of the layer of the material of the upper cladding 102b is, for example, 10 µm, and annealing is performed after layering to make it into transparent glass. As illustrated in FIG. 9A and FIG. 9B, in the state of this step, the core 103 is buried under the upper cladding 102b. Moreover, the portion at which the slit is to be formed is also filled with the material of the upper cladding 102b.

Figure 10A:
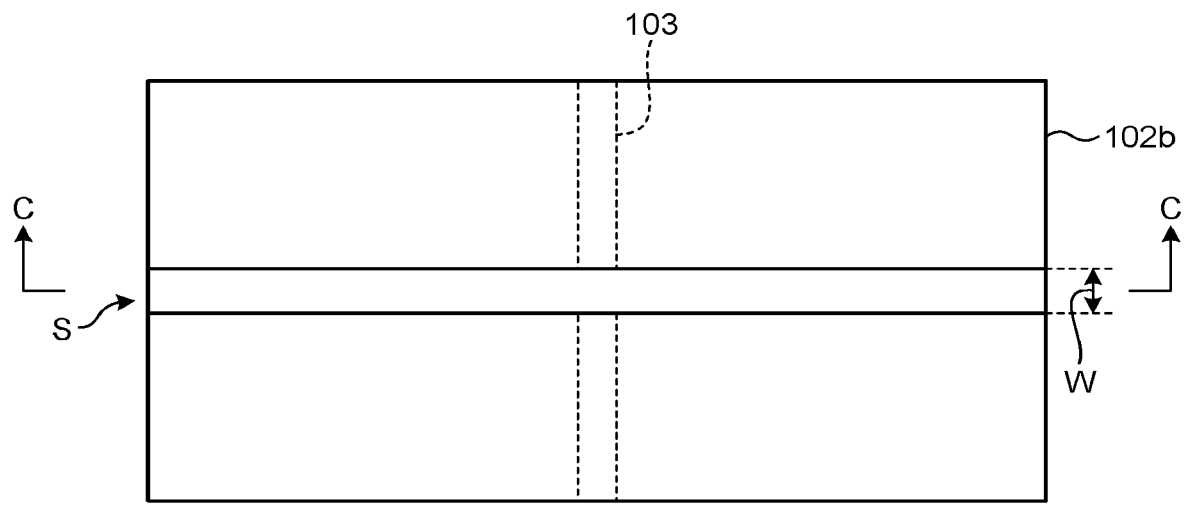
FIG. 10A is a top view illustrating a state after a slit is formed.
Figure 10B:
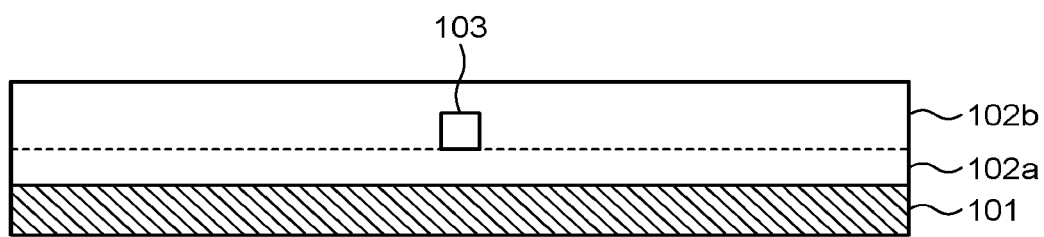
FIG. 10B is a cross section illustrating the state after the slit is formed.

Next, the layer of the material of the cladding 102 at the portion at which the layer of the material of the core 103 has been removed is removed by using the photolithography technique and the dry etching. FIG. 10A and FIG. 10B are a top view and a cross section illustrating the state after the slit S is formed, respectively. The depth of the slit S can be, for example, a depth up to the boundary between the lower cladding 102a and the substrate 101, but it is more preferable that the depth is as deep as to include part of the substrate 101. When the depth of the slit S is as deep as to include part of the substrate 101, the wave plate 104 to be inserted in the slit S becomes more stable. As described previously, when the substrate 101 is made of silicon, although it is necessary to change etching gases, for example, a portion up to the lower cladding 102a may be etched by using an etching gas, such as carbon tetrafluoride ($CF_6$), and the substrate 101 of silicon may be etched by using an etching gas, such as sulfur hexafluoride ($SF_6$). On the other hand, when the substrate 101 is made of quartz, without changing an etching gas, the slit S can be formed to a depth as deep as to include part of the substrate 101 in the same one step.

A width W of the slit S is preferable to be larger than the width L of the gap defined previously. This is because an unnecessary loss is generated at the slit if the width of the slit is smaller than the width L of the gap. If there is no manufacturing error, the width W of the slit is preferable to be the same as the width L of the gap defined previously. Therefore, it is preferable that the width W of the slit be equal to or larger than the width L of the gap defined previously, and a difference be as small as possible (for example, 1 μm or smaller). As illustrated in FIG. 10A and FIG. 10B, in the state of this step, the core 103 exposes on inner wall surfaces of the formed slit S.

While it is preferable that the width W of the slit be, for example, 15 μm, it is adjustable appropriately according to a purpose. When the thickness of a wave plate to be inserted in the slit S is T, the width W of the slit S is preferable to be (T+4) μm to (T+6) μm.

By thus removing a layer of a material of the core 103 at a portion in which the slit S is to be formed in advance, it is possible to make a layer to be dry etched be of the same material (the material of the lower cladding 102a and the upper cladding 102b) throughout the length of the slit S at the dry etching to form the slit S. Therefore, variations in depth can be suppressed. In other words, the residue 202a as illustrated in FIG. 5 is not generated on a bottom surface of the slit S.

Furthermore, according to the manufacturing method described above, even when a dopant having a higher refractive index, a lower linear thermal expansion, and a higher melting point than germania ($GeO_2$) is doped in the core 103, a dicing saw is not necessary to be used. Therefore, the slit S shorter than a slit formed by using a dicing saw can be formed. That is, according to the manufacturing method described above, the slit S can be formed in the region A apart from an end portion of the optical waveguide device 100.

Figure 11A:
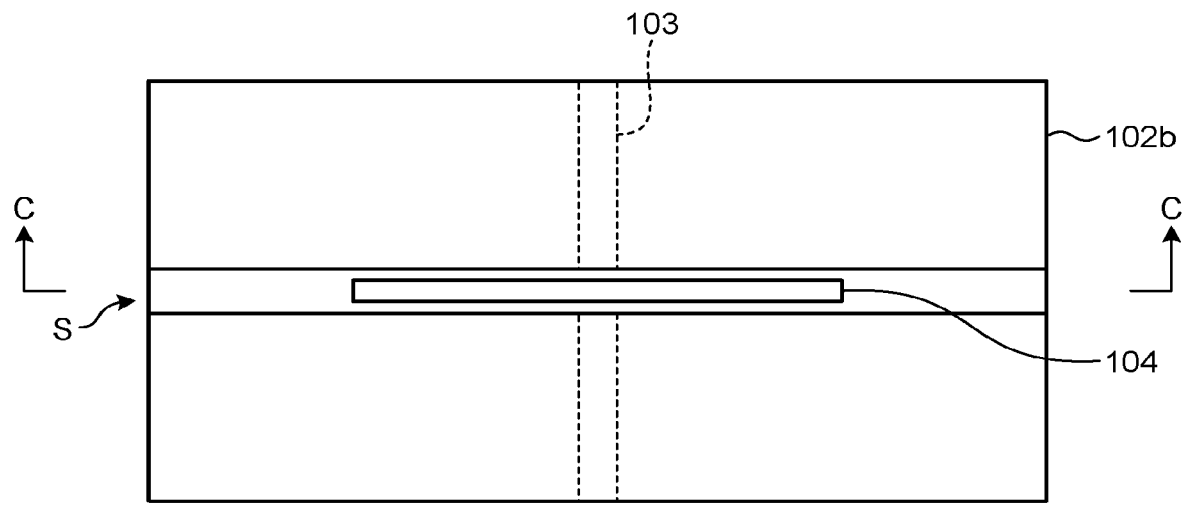
FIG. 11A is a top view illustrating a state in which a wave plate is inserted in the slit.
Figure 11B:
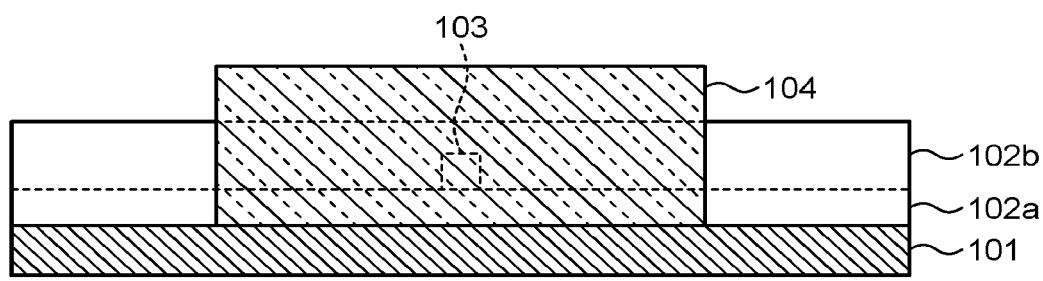
FIG. 11B is a cross section illustrating the state in which the wave plate is inserted in the slit.
Figure 12:
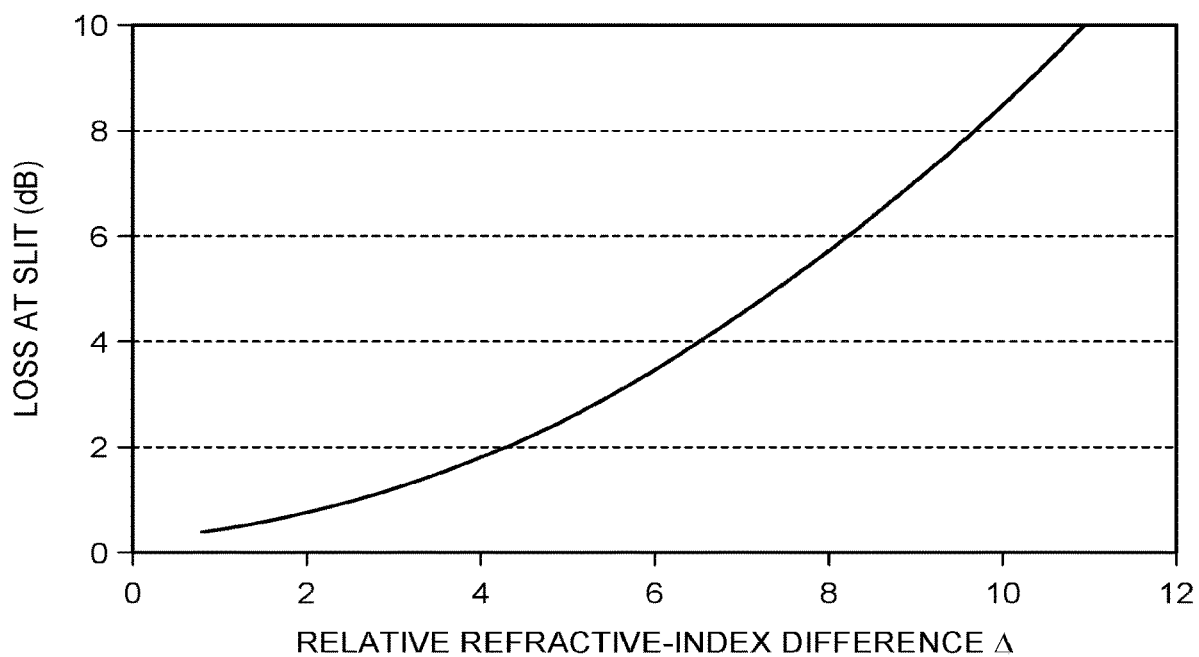
FIG. 12 is a graph showing an example of relationship between a relative refractive-index difference of an optical waveguide and an optical loss at a slit.

Finally, the wave plate 104 is inserted in the formed slit S. FIG. 11A and FIG. 11B are a top view and a cross section illustrating a state in which the wave plate 104 is inserted in the slit S, respectively. As illustrated in FIG. 11A and FIG. 11B, in the manufacturing method of the optical waveguide device according to the embodiment, variations in depth can be suppressed throughout the length (length in a transverse direction relative to an optical waveguide) of the slit S and, therefore, the wave plate 104 can be fixed without being inclined. That is, light propagating in the core 103 passes through the wave plate 104 properly, and the optical property is thereby stable.

The present disclosure has been described based on the embodiment, but the present disclosure is not limited to the embodiment described above. One configured by combining respective components of the respective embodiments described above appropriately is also included in the present disclosure. For example, a technique of suppressing an optical loss at a slit by designing the shape of a core near an end surface of the slit (for example, making it in a tapered shape) has been known. Moreover, arranging an incident waveguide angle for a slit to suppress reflection, and setting the waveguide angle to, for example, 8 degrees have also been known. By combining techniques to suppress an optical loss in the slit, the present disclosure can be more preferably implemented. More effects and modifications can be easily derived by those skilled in the art. Therefore, a broader mode of the present disclosure is not limited to the embodiment described above, and various modifications are applicable.

An optical waveguide device and a manufacturing method according to the present disclosure produce an effect that variations in optical properties at a slit arranged transversely to an optical waveguide are suppressed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A manufacturing method of an optical waveguide device that allows light to propagate though a core formed within a cladding formed on a substrate, the core having a higher refractive index than the cladding, the method comprising:

layering a first cladding-material layer as a lower cladding layer for the cladding and a core-material layer for the core sequentially on the substrate;

forming the core-material layer into a core having a predetermined waveguide shape, and removing a first part of the core, the first part being positioned at a portion in which a slit is to be formed, to thereby form a gap in the core, wherein L represents a width of the gap in the core;

layering a second cladding-material layer as an upper cladding layer for the cladding to cover the first cladding-material layer and the core such that the core is buried under the upper cladding layer and the gap having the width L is filled with a material of the upper cladding layer; and after the gap in the core has been formed, removing, by using dry-etching, a second part of the first and second cladding-material layers, the second part being positioned at the portion in which the slit is to be formed, to thereby form the slit which intersects the gap in the core, wherein:

W represents a width of the slit in the first and second cladding material layers and the width W of the slit is the same as the width L of the can such that the dry etching forms a slit sidewall having a continuous planar surface that includes the core, the lower cladding layer and the upper cladding layer, a depth of the slit is such that the dry etching removes part of substrate, the slit is formed by a separate process from the removing a first part of the core to form the gap in the core, on a bottom surface of the slit, in a region where the gap is formed by removing the core-material layer, there is no residue of a material of the cladding or the substrate, and on the bottom surface of the slit, in a region where the gap is not formed, there exists the residue.

2. The manufacturing method according to claim 1, wherein the core-material layer is quartz glass doped with a dopant that has a higher refractive index, a lower linear thermal-expansion coefficient, and a higher melting point than germania ($GeO_2$).

3. The manufacturing method according to claim 1, wherein
the core-material layer is doped with any one of niobium oxide ($N_2O_5$), tantalum oxide ($Ta_2O_5$), titanium oxide ($TiO_2$), zirconia ($ZrO_2$), and hafnium oxide ($HfO_2$).

4. The manufacturing method according to claim 1, wherein
a material of the substrate is quartz ($SiO_2$).

5. The manufacturing method according to claim 1, further comprising
inserting a wave plate in the slit.

* * * * *